Feb. 8, 1938.　　　　E. W. GRUMKE　　　　2,107,787
CARVING MACHINE BIT
Filed May 18, 1936

INVENTOR
EARL W. GRUMKE
BY Paul, Paul Moore
ATTORNEYS

Patented Feb. 8, 1938

2,107,787

UNITED STATES PATENT OFFICE 2,107,787

CARVING MACHINE BIT

Earl W. Grumke, St. Paul, Minn.

Application May 18, 1936, Serial No. 80,257

3 Claims. (Cl. 144—219)

This invention relates to improvements in cutter units for wood carving machines or the like, of the type which includes a pair of complemental cutting elements which are detachably clamped to a stem, or stem head, against axial and rotative motion.

A general object is to reduce the cost of manufacture and increase the efficiency of the clamping means. Another object is to reduce the amount of machining and to simplify the assembly of the cutter units, which assembly must be frequently made because it is necessary to frequently remove the blades for sharpening and to thereafter reassemble them.

Features of the invention include all details of construction relating to securing means for the blade, along with the broader ideas of means inherent in the disclosure.

Features of the invention include: the formation of stop lugs by punching; the location of the lugs; the use of means on the cutters to prevent axial motion; and to various combinations of the above.

Objects, features and advantages of the invention will be set forth in the description of the drawing forming a part of this application, and in said drawing Figure 1 is a side elevation of the tool;

Figure 1:
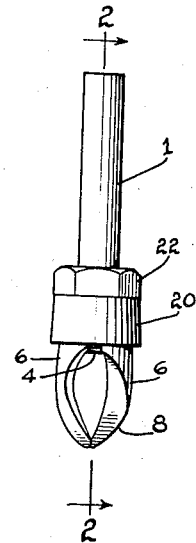

Numeral 1 indicates the shank of the device which is inserted in a suitable chuck, not shown. The shank 1 has an enlargement 2 exteriorly threaded as at 3. At the end of the shank is a head 4 which is spaced from the end of the enlargement 2, to provide a circumferential groove 5, providing a shoulder. The shank head and enlargement are preferably formed by turning. The head is frusto-conical with the conical surface converging inwardly or toward the opposite end of the shank.

The cutting part of the tool comprises a pair of complemental hollow, substantially semi-segments indicated at 6, and made in rights and lefts. Each segment has a forwardly leading cutting edge 8. Each segment is provided with a thickened segmental base or shank portion 10 having outer and inner conical surfaces 11, 12. The inner surface conforms substantially to the conical configuration of the head, in the manner shown. The upper end of each blade or cutter has an in-turned flange 13, as a stop, engaging the stop shoulder 14 to limit axial motion of the blade, which shoulder defines the lower side of groove 5.

Figure 4:
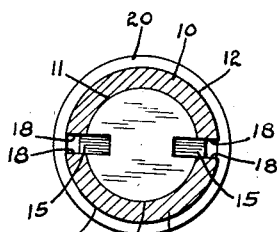
Figure 4 is a cross-section on line 4—4 of Figure 2.

To provide means for preventing circumferential movement of the blades or cutting segments and to simplify and facilitate assembly, the material of the head is punched outwardly, as shown, to provide, in this instance, diametrically related lugs 15 against which the end faces 18 of the parts 10 of the blades abut, see Figure 4. The punching tool is applied at the outer end of the head, and the operation is simple and can be cheaply accomplished.

Figure 2:
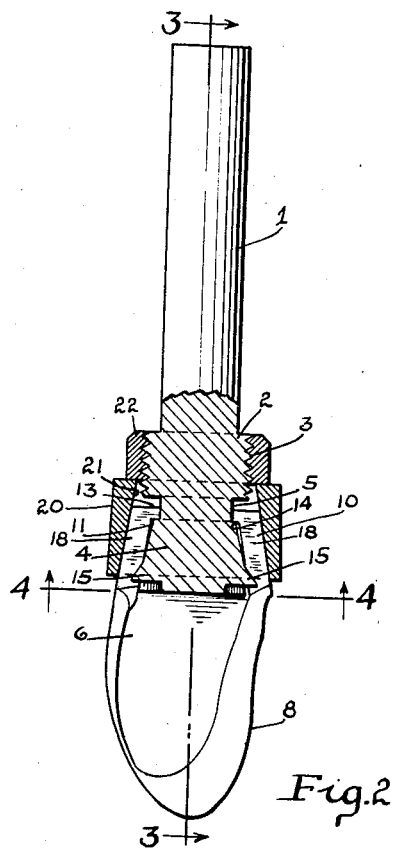
Figure 2 is a vertical longitudinal section taken on line 2—2 of Figure 1.
Figure 3:
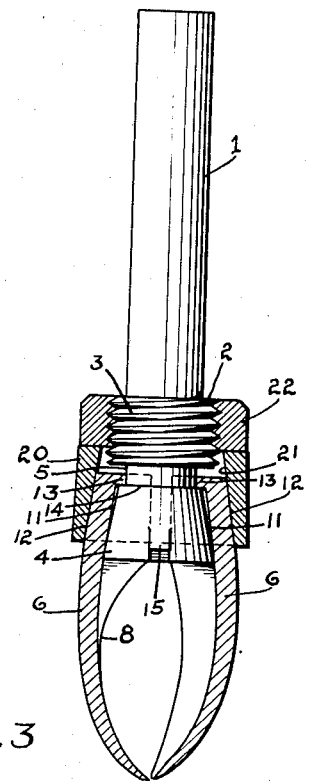
Figure 3 is a vertical longitudinal section taken approximately on line 3—3 of Figure 2.

Assembly is made by merely placing the segments in the position shown, and then applying a clamping sleeve to hold them against movement. This is accomplished by means of the wedging or cam sleeve 20 having an inner conical surface 21 which conforms to and cooperates with the outer surfaces 12 of the segments. To move the inner surfaces 11 against the head, a nut 22 cooperative with threads 3, abuts the end of the sleeve to secure it in the clamping position shown in Figures 2 and 3.

The present construction is very simple and efficient and substantially reduces the cost of manufacture, particularly of the means for preventing circumferential motion of the blades, because for this purpose there is no use of pins, nor of any devices which require special fitting, or which require meticulous registration of parts before assembly can be completed. Moreover, the use of the flanges in conjunction with the lugs gives, with the clamping sleeve, a very secure anchoring of the cutters.

I claim as my invention:

1. A cutting implement comprising, a stem having a frusto-conical head, a pair of cutting blades operably engaging the head, means by which the blades are releasably held to prevent motion axially of the head, said head having diametrically related outstanding stop lugs with which the side edges only of the blades engage in a manner to fix the blades against rotation on the head.

2. A cutting implement comprising a stem adapted to be introduced into a chuck, said stem having a frusto-conical head larger than the stem to form a shoulder at the inner end of the head, a pair of segmental cutting blades operatively engaged with the head and having in-turned portions engaging the shoulder to prevent movement of the blades axially of the head, and means by which the blades are releasably embraced to further secure them in operative position, said head having at the outer end, integrally formed outstanding stop lugs with which edges of the blades engage in a manner to fix them for rotation with the head.

3. A cutting implement comprising a stem, cutting blades having their inner faces contacting the stem, means by which the blades are releasably held to prevent motion axially of the head, said stem having outstanding lugs of one piece with the stem, with which the edges only of the blades engage in a manner to fix the blades against rotation on the stem.

EARL W. GRUMKE.